UNITED STATES PATENT OFFICE.

ERNST DÜRKOPF, OF DARMSTADT, GERMANY, ASSIGNOR TO THE FIRM OF E. MERCK, OF SAME PLACE.

BISMUTH METHYLENE-DI-GALLATE AND PROCESS OF MAKING IT.

SPECIFICATION forming part of Letters Patent No. 605,246, dated June 7, 1898.

Application filed May 26, 1896. Serial No. 593,174. (Specimens.) Patented in Germany June 18, 1895, No. 87,099.

*To all whom it may concern:*

Be it known that I, ERNST DÜRKOPF, of Darmstadt, Empire of Germany, have invented a new and useful Chemical Compound, to be known as "Bismal," and a Process of Manufacturing the Same, as hereinafter described, and for which I have obtained Letters Patent in Germany, No. 87,099, dated June 18, 1895.

My invention relates to the manufacture of a new chemical compound or salt possessing high medicinal virtues as an astringent and as an antiseptic when employed internally in various intestinal affections, as well as externally in skin diseases, &c., by causing chemical combination to take place between the metal bismuth or one of its oxids or hydroxids and an acid recently discovered by others which is described as methylene-di-gallic acid, ($C_{15}H_{12}O_{10}$,) and which acid is obtained as a molecular "condensation product" from formic aldehyde ($CH_2O$) and gallic acid, ($C_7H_6O_5$.)

The process of preparation of this new salt was described by me in part in E. Merck's *Bericht Ueber das Jahr*, 1895, on pages 20 and 21, in words of which the following is in part an exact translation:

"According to Caro (*Berichte der Deutschen Chemischen Gesellschaft zu Berlin*, 1892, page 946) the condensation product from gallic acid and formic aldehyde, which had been already before obtained by Baever (l. c., 1872, page 1096) and by Kleeberg (*Liebig's Annalen der Chemie*, Vol. 263, p. 284,) is to be considered as methylene-di-gallic acid.

"It is only the last-named of these investigators that makes a few statements in regard to the relations of this compound to bases. According to him the condensation product named is soluble in aqueous ammonia, and on driving off the redundant ammoniacal gas an acid salt may be obtained, while with phenylhydrazin a compound crystallizing in needle form is produced, which, however, at a gentle warmth is partially decomposed even by pure water as well as by alcohol. Although according to these observations it was hardly supposable that methylene-di-gallic acid would be capable of forming a salt with any of the heavy metals, it was to be expected, on the other hand, that if the attempt to prepare a bismuth salt of this acid should succeed such salt would be possessed of a specific action on the animal organism.

"After numerous experiments I succeeded in obtaining such a salt through the action of freshly-precipitated bismuth hydroxid on the methylene-di-gallic acid. For this purpose the two ingredients have to be digested together for a sufficient time at a gently-elevated temperature, an excess of bismuth hydroxid being supposed to have been at first introduced. The requisite complement of the acid is made up by adding small successive portions of it up to the time when the completion of the reaction shall have become evident, such complete reaction being shown by the entire solubility in soda solution of a sample of the solid product, which may be taken from time to time out of the digestion-bath.

"The bismuth salt thus obtained finally appears as a gray-blue very voluminous powder which is dissolved by alkaline solutions with the production of an orange color and is reprecipitable from such solutions by acids."

The new salt formed by my new process, forming the subject of my invention as described in the present application, is a true chemical compound of bismuth hydroxid with methylene-di-gallic acid and may be briefly called a "bismuth-hydroxid methylene-di-gallate."

Other processes by which I have found it possible to produce a bismuth-hydroxid methylene-di-gallate consist, for instance, in procuring a reaction between the sodium or other alkali salt of methylene-di-gallic acid and some soluble bismuth salt in aqueous solution; but such processes are here mentioned only for the sake of completeness of statement, the process above first described having been found the most practically serviceable of all and being therefore the one I chiefly employ in the preparation of my new product.

A practical example of the manufacture of this salt on a large scale is as follows: Ten kilograms of bismuth nitrate are converted by precipitation with about five kilograms of aqueous solution of ammonia of about 0.910 specific gravity into hydrated oxid of bismuth, which is then washed to free it from the ammonium nitrate formed in the reaction. The washed precipitate is stirred with water into the form of a thin magma. Then about seven and one-half kilograms of methylene-di-gallic acid ($C_{15}H_{12}O_{10}$) are added in the manner and under the limitation as above described in the extract from E. Merck's *Bericht*, &c., whereby the metallic hydroxid gradually takes up the acid, and a bismuth-hydroxid methylene-di-gallate is thus obtained, when washed and dried, in the form of a voluminous bluish-gray powder insoluble in water, but soluble in soda-lye with an orange color and reprecipitable therefrom by acids, as above described, differing herein from the hydrated bismuth oxid previously had, which latter is not soluble in soda-lye.

The new salt as described, however it may have been obtained, has proved to be a valuable addition to the materia medica, possessing, as it does, peculiar medical virtues of its own which are not possessed by the various compounds of bismuth with simple gallic acid or with other acids that were heretofore known.

Tri-bismuth-hydroxid tetra-methylene-di-gallate, which is a type of my product, is preferable to other medicinal salts of bismuth—as, for instance, bismuth subgallate—for use in colliquative diarrhea and other intestinal diseases; also, in dermic affections. Its virtues as an internal astringent are especially apparent in those persistent diarrheas which are not at all or only temporarily amenable to opiates, especially those occurring in connection with gynecological troubles or with tuberculosis. The medicament is administered pure in single doses, varying from 0.1 to 0.3 gram, taken from three times daily to every three hours.

I claim as new and desire to secure by Letters Patent—

1. The process of making a new astringent and antiseptic chemical compound directly from a freshly-prepared hydroxid of bismuth and methylene-di-gallic acid; by precipitating such hydroxid from a bismuth salt through the action of an alkali in the presence of water; washing the precipitate; and then allowing methylene-di-gallic acid to act in the presence of water upon such precipitate, by gradual addition and slow digestion at a moderately-elevated temperature, until the reaction is found to be completed; substantially as described.

2. The new chemical product, a bismuth-hydroxid methylene-di-gallate, consisting of bismuth-hydroxid in chemical union with methylene-di-gallic acid, and being further characterized by a voluminous powdery form; a blue-gray color; insolubility in water; solubility in alkaline solutions with an orange color; from which solutions it is reprecipitable in its original form by acids; substantially as described.

In testimony whereof I have signed my name to this specification in the presence of two subscribing witnesses.

ERNST DÜRKOPF.

Witnesses:
 W. HAÜSING,
 THEODOR ROURLE.